A. S. HART.
CAR RECORD BOOK.
APPLICATION FILED MAY 22, 1915.

1,172,284.

Patented Feb. 22, 1916.

UNITED STATES PATENT OFFICE.

ALPHONSE S. HART, OF ST. LOUIS, MISSOURI, ASSIGNOR TO CON. P. CURRAN PRINTING COMPANY, OF ST. LOUIS, MISSOURI, A CORPORATION OF MISSOURI.

CAR-RECORD BOOK.

1,172,284.  Specification of Letters Patent.  Patented Feb. 22, 1916.

Application filed May 22, 1915. Serial No. 29,826.

*To all whom it may concern:*

Be it known that I, ALPHONSE S. HART, a citizen of the United States, residing at St. Louis, Missouri, have invented a certain new and useful Improvement in Car-Record Books, of which the following is a full, clear, and exact description, such as will enable others skilled in the art to which it appertains to make and use the same.

This invention relates to car record books of the kind that are used for recording the movements of railroad cars.

The main object of my invention is to provide a car record book of the character mentioned which is so constructed that the movements of a particular car can be traced more quickly and easily than is possible with the car record books now in general use.

Another object is to provide a car record book which is so constructed that all of the movements that an ordinary car makes while the book is current can be recorded on a single page of the book.

Another object is to provide a car record book which is so constructed that only a comparatively few entries on a page have to be examined in tracing the movements of a particular car. And still another object is to provide a car record book which is so constructed that all of the entries which indicate the movements of a car of a certain number extend transversely across the page, either on one horizontal line or on two horizontal lines that contain suitable cross references for enabling the movements of that particular car to be followed easily.

Other objects and desirable features of my invention will be hereinafter pointed out.

The figure of the drawings is a top plan view of one complete page of my car record book.

Briefly described, my invention consists in a car record book composed of one hundred pages that are provided with numbers that determine the particular page of the book on which the movements of a car of a certain number are recorded. Each page is provided with a plurality of vertical columns for receiving entries relating to the movements of the cars, and in the preferred form of my invention as herein shown, the two terminal digits of a car number determine the particular page of the book on which the movements of that car are recorded and the third terminal digit of the car number determines the particular vertical column on the page on which the first entry indicating a movement of that car is recorded. Each page is also provided with a column for receiving the remaining digits of a car number so as to distinguish several entries that appear in the same vertical column and show that they relate to cars of different numbers, and each page is also provided with suitable spaces for receiving information or data that defines the ownership and character of various cars whose movements are recorded on the page. In the preferred form of my invention as herein shown, each complete page comprises duplicate portions so as to enable the movements of the cars owned or controlled by the railroad company operating the book to be kept separate from the record of movements of cars owned or controlled by other railroad companies.

While I have stated that the two terminal digits of the car numbers are utilized to determine the particular page of the book on which the movements of a car of a certain number are recorded, and that the third terminal digit of the car number is utilized to determine the particular place on the page where the first movement of a car of a certain number is recorded, I do not wish it to be understood that my invention is limited to a car record book constructed to be used in this exact manner, as my broad idea consists in a car record book comprising pages provided with numbers that determine the particular page on which the movements of a car of a certain number are recorded, each page having vertical columns for receiving entries relating to the movements of the cars, one of the intermediate digits of a car number determining the particular vertical column in which the first movement of a car of a certain number is recorded.

My improved book comprises one hundred complete pages numbered from 0 to 99, inclusive, and each page is provided with vertical columns, entry spaces and indicia arranged in the manner shown in the drawing, the pages being identical, except that each page is provided with a different number indicated by the reference character $y$. Each page is also preferably provided with an index tab 1300 that contains a number which corresponds to the number on the page. In the preferred form of my invention, as herein shown, each page comprises two identical portions provided at their upper ends with spaces that contain headings. One portion has a heading 200 consisting of the words "Home cars" and the other has a heading 300 consisting of the words "Foreign cars." The movements of the cars owned or controlled by the company operating the book are entered on that portion of the page headed "Home cars" and the movements of all other cars are recorded on the other portion of the page headed "Foreign cars." As both portions of the page are identical, I will only specifically describe that portion of the page headed "Home cars." As shown in the drawing, said portion is provided with two comparatively wide, vertical columns arranged adjacent the left-hand side of same, one having a heading 500 consisting of the word "Initial" and the other column having a heading 600 consisting of the word "Number." At the left of these two wide columns are two narrow columns provided with headings 700 and 800 consisting of the words "Line" and "Kind," respectively. At the right of the two wide, vertical columns headed "Initial" and "Number" are seventeen vertical columns divided by heavy lines, the first of these seventeen columns having a heading 400 consisting of "xxx"; the next ten having headings a consisting of the numerals 0 to 9 and the next six having no headings. These seventeen columns, which I will term for convenience, "movement columns," are each subdivided by a vertical line 1000 into two columns provided with headings 1100 and 1200 consisting of the letters "R" and "F," respectively. Information designating the movements of the cars is recorded in these seventeen columns just referred to.

A number of horizontally-disposed lines 900 that extend transversely across the page divide the various vertical columns previously mentioned into horizontal entry spaces, said lines being numbered or identified by the numerals 1, 2, 3, 4, 5, etc., arranged in vertical alinement with each other in the extreme left-hand column headed "Line." If desired, the space at the top of the page in which the heading "Home cars" appears may also be provided with a reference and instruction key that defines the meaning of the subheadings "R" and "F" of the movement columns and also defines the abbreviations used in the column headed "Kind." In the book herein shown the key consists of the letter "R" arranged opposite the word "Received" and the letter "F" arranged opposite the word "Forwarded," so as to indicate that "R" and "F" stand for the words "received" and "forwarded." At the right of these words is a heading "Kind of car" under which the letters "B," "C," "F," "S" and "R" are arranged opposite the words "Box," "Coal," "Flat," "Stock" and "Refrigerator," respectively, so as to define the abbreviations used in the column headed "Kind." Any further instructions as to the method of operating the book may, if desired, be printed in the space at the top of the page. For example, entries in black indicate loaded cars and entries in red indicate empty cars.

In recording the movements of cars received and forwarded by the railroad company operating the book the two terminal digits of the car number determine the particular page of the book on which the movement or movements of the car are recorded and the third terminal digit of the car number determines the particular place on the page where the first entry relating to the car is made. For example, if the railroad company using the book receives a car whose number is 15,533, the movement of this car is entered on page 33 of the book in the following manner: If the car is a box car the letter "B" is placed in the column headed "Kind" and the initials of the car are placed in the column headed "Initial." The first two digits of the car number, namely, "1" and "5" are placed in the column headed "Number" and certain information relating to the movement of the car is placed in the movement column headed "5," as the third terminal digit of the car number is "5." This information may vary, but one convenient way of operating the book is to insert the date on which the car was received in the left-hand portion of column 5 headed "R," together with the number of the train that car No. 15,533 formed part of. As shown in the drawing, the date "6—1" and the number "79" are inserted in the column headed "R" above the horizontal line "1," so as to indicate that car No. 15,533 was received on June 1st on train No. 79. When the railroad company operating the book forwards this car, No. 15,533, the date on which the car is forwarded, together with the number of the train that the car forms part of,—for example "6—4" and also the numeral "6" are inserted in the right-hand section of the column 5 headed "F," thus indicating that car No. 15,533 was forwarded on June 4th on train No. 6. Subsequent movements of this car No. 15,533 are entered to the right of the first entry in horizontal alinement with said first entry, the entries extending transversely across the page, as shown in the drawing. When all of the spaces on line 1 have been filled up subsequent entries relating to the movements of this car No. 15,533 are made on a lower line of the page; for example, on line 7, the numeral 7 surrounded by a circle being placed at the right-hand end of line 1, so as to indicate that other entries relating to the movements of this car will be found on line 7 and the numeral 1 surrounded by a circle being placed on line 7 in the column headed "Number," so as to indicate that the entries on line 7 form part of the complete record on line 1. The movements of the next car received by the company operating the book whose number ends with "33" is also entered on page 33, and if the number of the car is 49,833, the date on which the car was received, together with the train number, are entered in the movement column headed "8," as shown in the drawing, the first two digits of the car number, namely "4" and "9," being inserted in the column headed "Number," the initials of the car, namely, "C. & A.," being inserted in the column headed "Initial" and the letter "R" being inserted in the column headed "Kind" to indicate that car No. 49,833 is a "refrigerator" car. If the company operating the book receives a foreign car, namely, a car owned or controlled by some other railroad, the record of this car is entered on the right-hand portion of the page headed "Foreign cars." For example, if an "M. P." car is received whose number is 21,233, the date on which the car is received and the train number are entered in column 2 in the section of said column headed "R," the first two digits of the car, namely, "2" and "1," being inserted in the column headed "Number" and the initials of the car being inserted in the column headed "Initial." The letter "F" is inserted in the column headed "Kind" to indicate that M. P. Car No. 21,233 is a flat car. If the company receives a car whose number is less than 1000, the complete number of the car inclosed in a circle is inserted in the column headed "Number," and the entry relating to the movement of this car is inserted in the vertical column headed "xxx." For example, if the company receives one of its own cars, No. 433, the number "433" inclosed in a circle is placed in the column headed "Number" and the date that the car was received, together with the train number, are inserted in the column headed "xxx" in the "Received" portion of said column, as indicated on the drawing. The date on which this car is forwarded, together with the number of the train are inserted in the section of this column headed "F."

It is, of course, immaterial, so far as my broad idea is concerned, what particular indicia is used to form headings for the various columns, so long as the columns are provided with means for indicating the meaning of the entries in the columns. If desired, the two portions of the page may be duplicated, if it is desired to form a larger book, the duplicate portions relating to home cars being arranged on the left-hand side of the dividing line of the complete page and the duplicate portions relating to foreign cars being arranged on the right-hand side of the dividing line of the complete page. In all instances, however, the book is so constructed that one complete page will be exposed to view when the book is opened.

With a car record book of the construction above described the movements of a car may be traced more quickly and easily than is possible with the car record books now in general use, owing to the fact that all of the entries relating to a car of a certain number appear on one page of the book and are so arranged that only a comparatively few entries have to be examined in tracing the movements of the car. Furthermore, as all of the entries relating to a car of a certain number extend transversely across the page, either on one line or on two or more lines that contain suitable cross references, it is a very easy matter to trace the movements of the car. If it is desired to trace the movements of car No. 15,533, the book is opened at page 33 and movement column headed "5" on the "Home car" portion of the page is first examined, as this is the only column on that portion of the page that will contain an entry relating to a car of this number. If column "5" contains an entry the person tracing the car will then glance to the left to column headed "Number" to ascertain whether or not said column contains the numbers "1" and "5", which are the first two digits of the car number. In the example given the person tracing the car will find all of the movements of car No. 15,533 recorded on lines 1 and 7 of page 33, and he will also ascertain that this car was a "box" car controlled by the C. & A. Railroad. If the car being traced is No. 17,533, movement column headed "5" is first examined, and when the tracer finds it contains an entry, he immediately glances to the left to the column headed "Number", and when he sees that the entry in the "Number" column consists of the digits "1" and "5", he knows immediately that this is not the car in which he is interested. He then drops down the movement column headed "5", and when he comes to the next entry in said column he glances to the left into the column headed "Number", and upon ascertaining that said "Number" column contains the digits "1" and "7", he knows immediately that this is the car whose movements he is tracing, namely, car No. 17,533. If the number of the car being traced is less than 1000 and ends with 33, the only column on page 33 that it is necessary to examine is the column headed "Number" on either the "Home car" portion or "Foreign car" portion of the page.

From the foregoing it will be seen that my improved record is so constructed that a person tracing the movements of a car only has to examine comparatively few entries in order to locate the first entry relating to the movement of the car, this being due to the fact that the first entry appears in the movement column whose heading corresponds with the third terminal digit of the car number and this entry is distinguished from other entries in the same movement column by the number or digit arranged at the left of same in the column headed "Number". All of the subsequent entries relating to the movement of the particular car in question appear at the right of the first entry and extend transversely across the page. The person tracing the movements of a car generally knows whether it is a car owned by the company operating the book or by a company not affiliated with the owner of the book; consequently, it is only necessary, usually, to examine one portion of the page, as the book is so constructed that the "Home" cars are separated from the "Foreign" cars.

Having thus described my invention, what I claim, and desire to secure by Letters Patent, is:

1. A car record book, comprising pages provided with numbers that determine the particular page of the book on which the movement of a car of a certain number is recorded, a plurality of parallel vertical columns on each page, ten of which are provided with headings consisting of the numerals 0 to 9 inclusive and spaces on the page arranged at one side of said group of vertical columns in which information can be placed in horizontal alinement with the entries in said vertical columns.

2. A car record book, comprising pages provided with numbers that determine the particular page of the book on which the movement of a car of a certain number is recorded, a plurality of vertical columns on each page, ten of which are provided with headings consisting of the numerals 0 to 9 inclusive and a separate column on each page arranged parallel to and at one side of said group of vertical columns for receiving one or more digits of a car number.

3. A car record book, comprising pages provided with numbers that determine the particular page of the book on which the movement of a car of a certain number is recorded, a plurality of vertical columns on each page, some of which are provided with headings consisting of the numerals 0 to 9, and independent columns arranged at the left of said group of vertical columns and subdivided into spaces by means of horizontal rulings, thereby enabling all information relating to a car of a certain number to be arranged horizontally across the page.

4. A car record book, comprising pages provided with numbers that determine the particular page of a book on which the movement of a car of a certain number is recorded, entry spaces extending transversely across each page and arranged in such a manner that a plurality of said spaces will be in vertical alinement, headings for said vertically alined spaces, and a column on each page that is adapted to receive information that distinguishes one first entry from another first entry arranged in vertical alinement with same.

5. A car record book, comprising pages provided with numbers that determine the particular page of the book on which the entries relating to a car of a certain number are recorded, a plurality of vertical columns on each page, ten of which are provided with headings consisting of the numerals 0 to 9, and vertical rulings that divide each of said columns into two portions or sections that are adapted to receive information relating to cars that are received and cars that are forwarded.

6. A car record book, comprising pages provided with numbers that determine the particular page of the book on which the entries relating to a car of a certain number are recorded, a plurality of parallel vertical columns on each page, ten of which are provided with headings consisting of the numerals 0 to 9, two portions or sections in each of said columns provided with different headings, and a vertical column on each page that is adapted to receive the first digits of the car numbers that are recorded on said page.

7. A car record book, comprising pages provided with numbers that determine the particular page of the book on which the entries relating to a car of a certain number are recorded, a plurality of vertical columns on each page, ten of which are provided with headings consisting of the numerals 0 to 9, each of said vertical columns being divided into two sections that have different headings, a vertical column on each page that is adapted to receive the first digits of the car numbers that are recorded on said page, and spaces on each page arranged underneath headings which indicate that the entries in said spaces define the character and ownership of the cars whose movements are recorded on the page.

8. A car record book, comprising pages provided with numbers, a plurality of vertical columns on each page, one of which is provided with a heading which indicates that said column is adapted to receive information relating to the movement of cars whose numbers are less than 1000, headings for some of the other columns consisting of the numerals 0 to 9 inclusive, and a number column on each page for the purpose described.

9. A car record book, comprising pages provided with numbers that determine the particular page of the book on which the movement of a car of a certain number is recorded, each page comprising separate portions in which the movements of "Home" cars and "Foreign" cars are recorded, and a plurality of vertical columns on each portion of the page arranged in parallel relation and ten of which are provided with headings consisting of the numerals 0 to 9, thereby enabling the entries relating to the movements of a car of a certain number to extend transversely across each portion of the page, either on a single line or on a plurality of lines that are cross referenced.

10. A car record book provided with one hundred pages numbered from 0 to 99, inclusive, horizontal lines extending transversely across the page and provided with numbers, a plurality of vertical columns, ten of which have headings consisting of the numerals 0 to 9, inclusive, and an initial column and a number column arranged at one side of said vertical columns for the purposes described.

11. A car record book provided with one hundred pages numbered from 0 to 99, inclusive, horizontal lines extending transversely across the page and provided with numbers, a plurality of vertical columns, ten of which have headings consisting of the numerals 0 to 9, inclusive, an initial column and a number column arranged at one side of said vertical columns, one of said vertical columns having a heading which indicates that said column is adapted to receive entries relating to cars whose numbers are less than 1000, and an independent column on the page provided with a heading which indicates that the entries in same define the character of the cars whose movements are recorded on the page.

12. A car record book, comprising one hundred pages numbered from 0 to 99, inclusive, each page comprising two portions, one that relates to "Home" cars and the other to "Foreign" cars, a plurality of horizontally-arranged lines extending transversely across each portion of the page and provided with numbers, vertical columns on each portion of the page provided with headings which indicate that the entries in same define the character and ownership of the cars whose movements are recorded on the page, a number column on each portion of the page that is adapted to receive the first digits of the car numbers, and a plurality of columns arranged at the right of said number column, each of which is subdivided into two sections and ten of which columns are provided with different headings.

13. A car record book, comprising one hundred pages numbered from 0 to 99, inclusive, a plurality of vertical columns on each page that are adapted to receive information relating to the movements of cars whose numbers end with digits that correspond to the number on the page, the particular column in which the first entry of a car of a certain number is recorded being determined by the third terminal digit of the car number, headings consisting of the numerals 0 to 9 inclusive for ten of said columns, and separate sections in each of said columns that are adapted to receive information relating to cars that are received and cars that are forwarded.

In testimony whereof I hereunto affix my signature in the presence of two witnesses, this nineteenth day of May 1915.

ALPHONSE S. HART.

Witnesses:
WELLS L. CHURCH,
GEORGE BAKEWELL.

Copies of this patent may be obtained for five cents each, by addressing the "Commissioner of Patents, Washington, D. C."